United States Patent Office 2,811,677
Patented Oct. 29, 1957

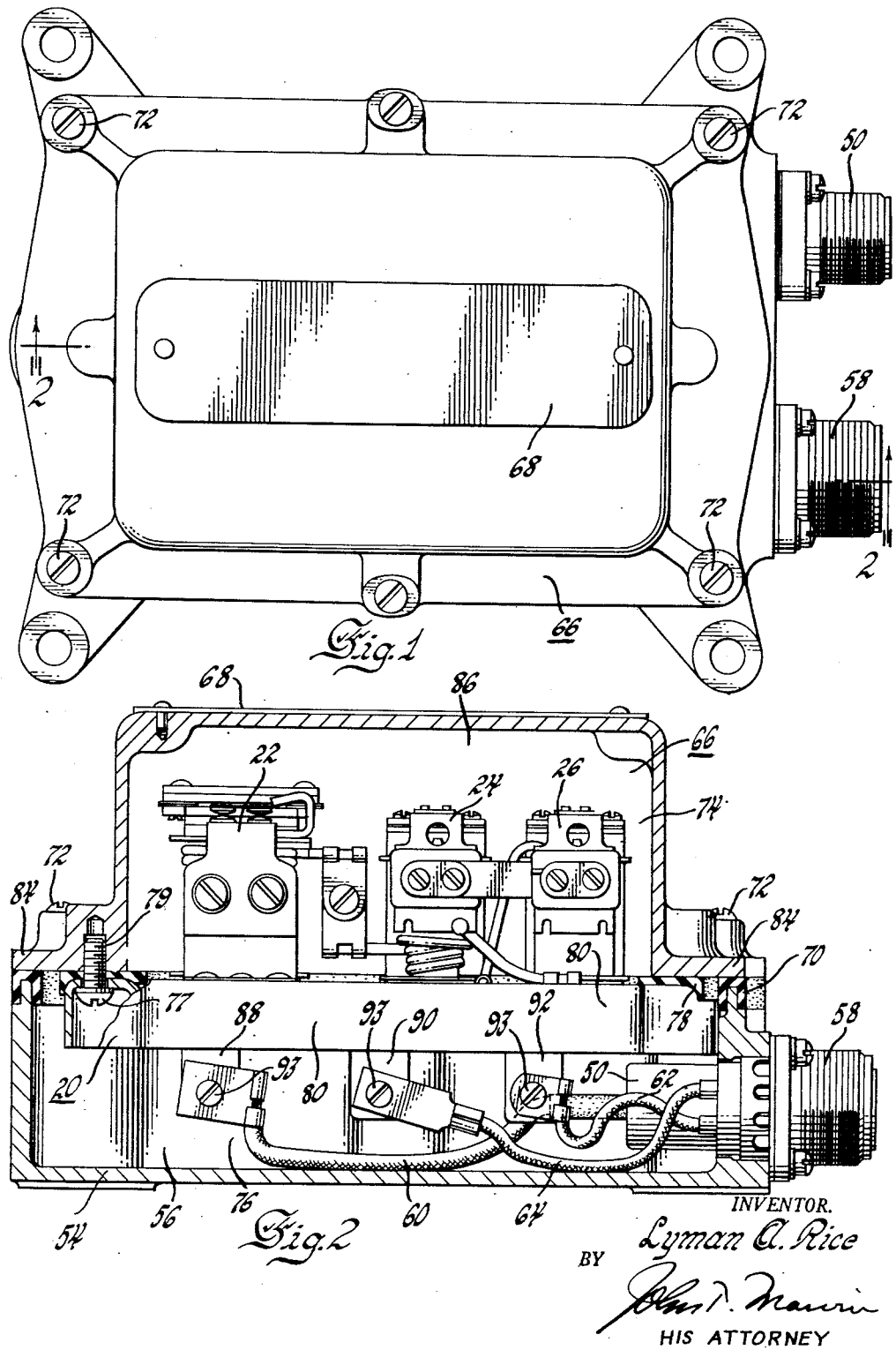

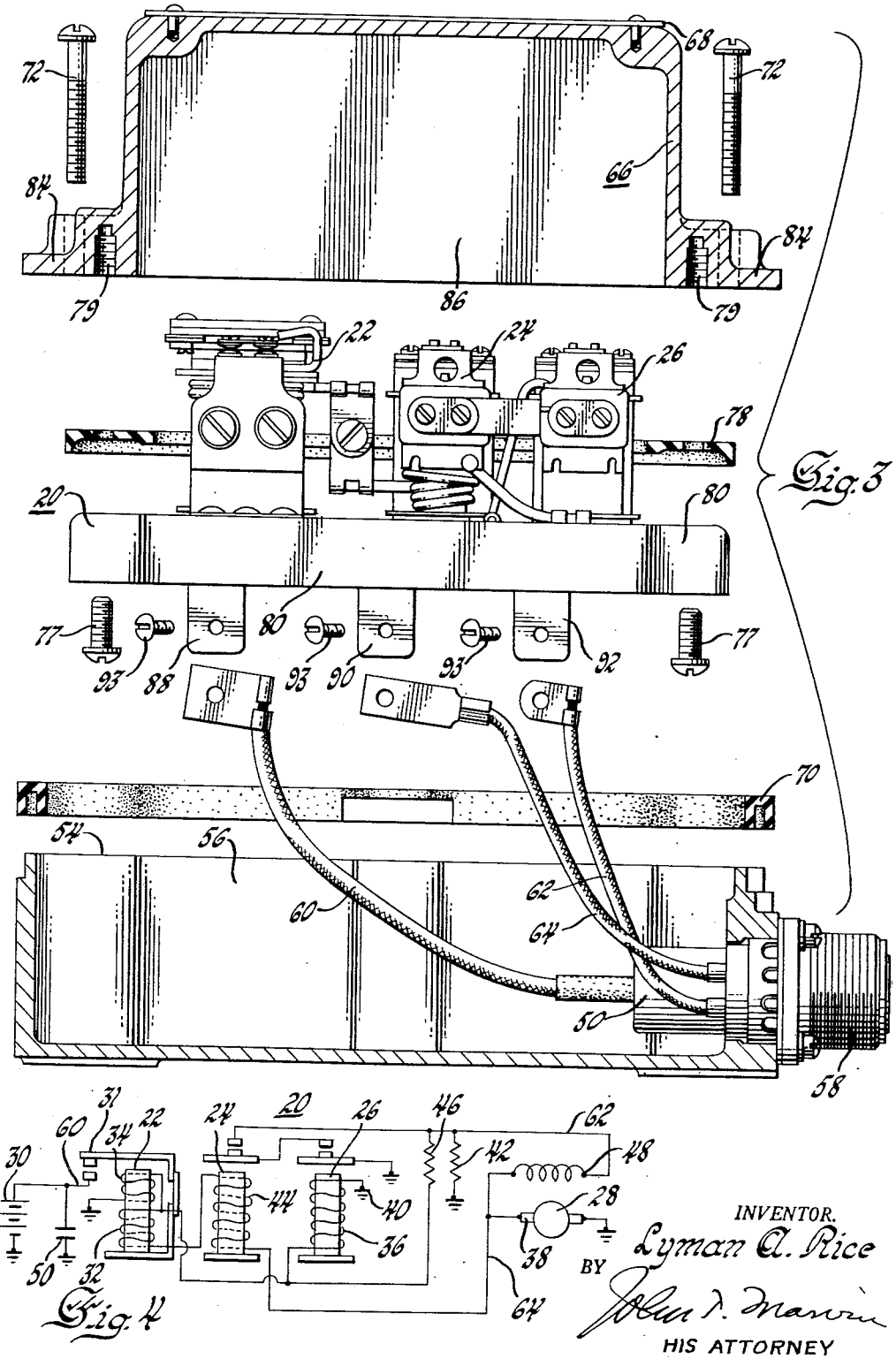

2,811,677

REGULATOR

Lyman A. Rice, Anderson, Ind., assignor to General Motors Corporation, Detroit, Mich., a corporation of Delaware Application September 22, 1954, Serial No. 457,739

4 Claims. (Cl. 317—99)

This invention relates to regulators and more particularly to a regulator which controls the output of a generator in a battery charging system.

In present day radio and television communication systems, reception difficulty is encountered from the electrical interference as generated by battery charging systems. This interference is particularly increased when the systems are installed in trucks, buses, pleasure vehicles, or in ships that travel either on land, in the air or in the water, for in these installations, the large amount of metal present provides a large antenna surface which increases the effect of the electrical interference on the sending and receiving equipment which may be in the vicinity of the vehicle.

To reduce the interference which these systems emit, it is the usual practice to install various electrical suppression units in the system. These suppression units are costly and frequently are wired in rather intricate circuits with the voltage and current regulator of the generating system and when so wired are frequently connected with the component parts of the regulator in such a manner so as to require the replacement of the entire regulator unit including the suppression units when one of the relays of the regulator requires replacement or service.

This invention is directed to the elimination of the above difficulties. This objective is accomplished by providing a regulator unit assembly wherein all suppression units are carried and enclosed by the base of the unit and the relays of the regulator are carried by the cover so that one or the other may be replaced or serviced without disturbing the other.

It is an object, therefore, of the present invention to completely enclose and support the suppression components for a current and/or voltage regulator within a recessed base and provide a cover for the base which cover carries a second base which supports the various relays of the regulator so that the relays may be removed from a position within a regulator cover without disturbing the suppression units.

It is a further object of the present invention to provide an instrument assembly wherein various electrical suppression components are contained in a recess in a base, which instrument assembly is constructed and arranged so that the various relays which comprise the regulating parts of the assembly may be removed from the instrument assembly without disturbing the suppression units as contained in the base.

Further objects and advantages of the present invention will be apparent from the following description, reference being had to the accompanying drawings wherein a preferred embodiment of the present invention is clearly shown.

In the drawings:

Figure 1 is a top plan view of the regulator assembly according to the present invention.

Figure 2 is a view partly in section along lines 2—2 in Figure 1 showing the parts in position within the assembly base and cover therefor.

Figure 3 is an exploded view partly in section taken along lines 2—2 in Figure 1 showing the cover, the regulator subassembly as carried by the cover, and the suppression units as positioned and carried by the base.

Figure 4 is a wiring diagram of a typical battery generator circuit which includes a cut-out, current and voltage regulator relays which may be installed in the regulator assembly according to the present invention.

In the drawings the regulator subassembly 20 shown includes a cutout relay 22, a current regulator relay 24, and a voltage regulating relay 26 which are included in a circuit with a generator 28 and a battery 30 as shown in Figure 4. The cutout relay 22 closes the generator to battery circuit when the generator 28 voltage is sufficient to charge battery 30 and opens the circuit when the generator 28 slows down or stops. The voltage regulator relay 26 is a voltage limiting device that prevents the system voltage from exceeding a specified maximum and thus protects the battery 30 and other voltage sensitive equipment. The current regulator relay 24 is a current limiting device that limits the generator output so as to not exceed its rated maximum. The cutout relay 22 has two windings, a series winding 32 and a shunt winding 34. The shunt winding is connected in circuit with generator 28 so that the generator 28 output voltage is impressed upon it at all times. The series winding 32 is connected in series with the charging circuit so that all the generator 28 current output passes therethrough. The cutout relay core and windings are assembled on a frame which has a flat steel armature 31 attached thereto by a flexible hinge. The cutout relay armature is centered above the core and the contacts associated with the frame and armature are held separated, by a spring, not shown, when the generator is not operating.

When a generator voltage builds up to a value great enough to charge the battery, the magnetism induced by the relay windings 32 and 34 is sufficient to overcome the tension of the spring and to pull the cutout relay armature toward the core so that the contact points close. This completes the circuit between the generator and battery. When this circuit is made current passes through the series winding in a direction to add to the magnetism of the shunt winding and the resulting magnetism more tightly holds the armature down to maintain the contact points in tight engagement.

When the generator slows down and stops, the current begins to flow from the battery 30 to the generator 28. This reversal of current through the series windings 32 causes reversal of the magnetic field induced thereby. The magnetic field of the shunt winding 34 does not reverse. Therefore instead of aiding each other, the two windings now magnetically oppose each other so that the resultant field is insufficient to hold the armature down and the spring, not shown, pulls the armature away from the core so that the contacts separate. This separation of the contacts opens the circuit between the generator 28 and battery 30.

The voltage regulator relay 26 has a shunt winding 36 which is connected between the generator output terminal 38 and ground 40. The winding and a core are assembled to a frame which supports a movable armature through a flexible hinge. The armature supports a movable contact which is normally maintained in engagement with a stationary contact by a spring, not shown.

When the generator 28 voltage reaches the value for which the voltage regulator relay 26 is adjusted, the magnetic field produced by the winding 36 overcomes the armature spring tension and pulls the armature down to separate the contacts. The separation of the contacts causes all the current in the generator 28 field to pass through a resistance 42 to reduce the excitation of the generator 28 field and correspondingly reduce the generator 28 output. This reduction of generator 28 output reduces the magnetic field of the shunt winding 36 so that the magnetic field is sufficiently weakened to permit the spring, not shown, to urge the relay 26 armature away from the core and close the movable and stationary contact points. The closing of the contacts directly grounds the generator 28 field causing the excitation of the generator 28 field to be increased and the generator 28 voltage and output to increase. The above cycle of action takes place rapidly and thus the voltage output of the generator 28 is regulated to any predetermined value.

The current regulator 24 has a series winding 44 which carries the entire generator 28 output current. The winding 44 and a core are assembled on a frame which supports an armature through a flexible hinge so that the armature is disposed above the core. The armature carries a movable contact which is maintained in engagement with a stationary contact by a spring, not shown, when no current is flowing through winding 44. When the current relay 24 and the voltage relay 26 contacts are closed the field circuit of generator 28 is completed to ground 40 as clearly seen in the drawings.

When the generator output reaches a value for which the current regulator relay 24 is adjusted, the magnetic pull of the winding 44 overcomes the armature spring tension and thus opens the contacts. This opening of the current regulator 24 contacts introduces the resistance 42 in the generator 28 field circuit which causes a reduction in the generator 28 output. The reduction in the generator output decreases the holding effect of the magnetic field of relay 24 and permits the spring to cause the contact points to close so as to ground the generator 28 field and cause the output thereof to increase. This cycle is repeated with a great rapidity so as to limit the generator current output to a predetermined maximum.

The current and voltage regulator unit circuits use two common resistors 42 and 46. Resistance 42 is inserted in the field circuit when either the current 24 or the voltage regulator units 26 operate. The resistance 46 is connected between the generator field terminal 48 and the cutout relay frame so that resistance 46 is electrically in parallel with the generator 28 field coils through a circuit which includes the winding 34 of the cutout relay. The sudden reduction in field current which occurs when either the current 24 or voltage regulator 26 points open, is accompanied by a surge of induced voltage in the field coils of the generator when the strength of the magnetic field changes. These surges are partially dissipated by the resistors 42 and 46 to aid in the preventing of excessive arcing at the contacts.

The instrument or regulator assembly, shown in Figures 1–3, includes a base 54 that has a recess 56 which forms an inclosure for a feed through capacitor 50 and a terminal connector 58. The terminal connector 58 is mounted in the walls of base 54 and is adapted to be connected with the electrical field terminal lead 62 and the generator output terminal lead 64 of the battery system, which are shielded and terminate in a suitable female connector, not shown, that is adapted to be joined with connector 58 to provide a shielded wire assembly as known to those skilled in the art. The capacitor 50, which may be of any suitable well known type, is secured in one of the walls of the cast base 54 and is constructed to be water tight and has a threaded male end which may be connected with the female end of a suitable connector of a shielded grounded conductor which connects the regulator cutout relay 22 through lead 60 with battery 30. The leads 62 and 64 of terminal are sealed in connector 58 by a packing not shown.

A cover 66, which may have a suitable name plate 68 secured thereon is provided for the recessed base 54 and is sealingly secured thereto by means of sealing gasket 70 and screws 72 to form an enclosure which is divided into an upper 74 and lower 76 chamber when a current and voltage regulator subassembly 20 is sealingly secured in the inside of the cover 66 by screws 77 which when tightened in the tapped holes 79 compresses a gasket 78 between the base 80 for the regulator subassembly 20 and a flange 84 surrounding a recess 86 in the cover 66.

The current and voltage regulator subassembly 20 comprises a cutout relay 22, a current regulator 24, a voltage regulator 26 which may be circuited as heretofore described and which are constructed and mounted on a base 80 so that the terminal leads 88, 90, and 92 respectively extend into the lower chamber 76 when the cover 66 is assembled with the base 54.

The current and voltage regulator relays 24 and 26 may be of the conventional types or of the type shown and described in application Serial Number 426,085 as assigned to the assignee of the present invention. The cutout relay 22 also may be of any conventional type or of the type as shown in U. S. Patent 2,003,021, granted to Raymond E. Sullivan, which has also been assigned to the present invention. The terminals 88, 90 and 92 are secured to leads 60, 64 and 62 respectively, as shown in Figure 2, by means of securing screws 93.

It is manifest from the above that when the various parts of the regulator assembly 20 are secured to each other as in Figure 2, a substantially water-tight regulator will be provided that electrically shields and positions the electrical interference suppression units and the terminal connectors in the base 54 and the current and voltage regulator subassembly 20 which is carried by the cover 66.

The replacement of any of the suppression units as carried in the recess 76 of base 54 or any other suppression units which may be included therein may be accomplished without disturbing the parts of the regulator subassembly 20. To remove any of the suppression units, the screws 72 and the cover 66, which also carries the regulator subassembly 20 are removed from the base 54 and the suppression units contained within recess 76, are completely exposed for service.

It has been found that failures also frequently occur in one of the relays in the regulator subassembly 20. Heretofore when this occurred it has been necessary to replace the entire regulator assembly which included the suppression units. This is not necessary when the regulator assembly according to the present invention is utilized as the regulator subassembly 20, which includes the current, voltage and cutout relays may be replaced without disturbing the radio suppression units which are contained in the base 54. This is a marked improvement in regulators as it reduces considerably both the expense as well as time in servicing these units.

Further it is well known that the current and voltage regulator units are generally adjusted by the manufacturer before shipment so that the regulators will perform properly when they are placed in service. These adjustments are critical and as the parts of the relays are relatively delicate they require protection during shipment. Thus if the present invention is utilized, the regulator subassembly can be protected during shipment by an inexpensive metal or suitable plastic shipping cover, not shown, which can be secured by screws to base 80 during shipment. The shipping cover can be discarded when the replacement regulator subassembly 20 is installed in the cover 66.

While the embodiment of the present invention as herein disclosed, constitutes a preferred form, it is to be understood that other forms might be adopted.

What is claimed is as follows:

1. A current and voltage regulator assembly for use in a storage battery charging circuit comprising in combination; a base having a recess, a plurality of electrical parts carried by said base and disposed within said recess, a cover adapted to form an enclosed chamber with the recess of said base, a current and voltage regulator subassembly removably carried by and completely enclosed by said cover, said subassembly comprising; a current regulator relay, a voltage regulator relay and a cutout relay, all of said relays being carried on a relay base and having terminals disposed in said recess when said cover is positioned on said base whereby electrical parts contained within said recess may be replaced without disturbing the current and voltage regulator assembly.

2. A current and voltage regulator assembly for use in a battery charging circuit comprising in combination; a base having a recess therein; a plurality of electrical parts carried by said base and disposed within said recess a cover for said base adapted to form an enclosed chamber therewith, a current and voltage regulator subassembly removably carried by and completely enclosed by said cover, said subassembly comprising; a current regulator relay, a voltage regulator relay and a cutout relay, all of said relays being carried on a base securable to said cover and having terminals disposed in said recess when said cover is positioned on said base whereby said subassembly may be removed from said regulator assembly without disturbing other electrical parts contained in the recess of said base.

3. An instrument assembly for use in a battery charging circuit comprising in combination; an assembly base having a recess, a cover for said base adapted to form an enclosed chamber with said base, an electromagnetic assembly having a base carried by said cover and disposed to divide said chamber into upper and lower chambers wherein said lower chamber is defined by a portion of the recess of said assembly base, said regulator assembly having a plurality of relays disposed in said upper chamber each of said relays having terminal portions extending into said lower chamber, said assembly base forming a support for an electrical suppressor unit and a terminal connector unit adapted for use with a shielded conductor, all of said parts being constructed and arranged so the electromagnetic assembly may be replaced without disturbing the units within said recess.

4. In an instrument assembly for use in a battery charging circuit, the combination comprising; a means for supporting and enclosing suppression units for an electrical circuit, a second means for supporting a plurality of relay units, a common cover completely enclosing the units carried on said means so each of said means may be removed from said assembly without disturbing the units carried by said other means.

References Cited in the file of this patent

UNITED STATES PATENTS

| | | |
|---|---|---|
| 2,344,441 | Lorenz | Mar. 14, 1944 |
| 2,358,482 | Thompson | Sept. 19, 1944 |
| 2,644,869 | Sevison | July 7, 1953 |